(12) United States Patent
Martin et al.

(10) Patent No.: US 8,479,106 B2
(45) Date of Patent: Jul. 2, 2013

(54) METHOD AND DEVICE TO SIMPLIFY MESSAGE COMPOSITION

(75) Inventors: Daryl J. Martin, Waterloo (CA); James Godfrey, Waterloo (CA); John F. Wilson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 367 days.

(21) Appl. No.: 12/394,310

(22) Filed: Feb. 27, 2009

(65) Prior Publication Data

US 2010/0223561 A1   Sep. 2, 2010

(51) Int. Cl.
*G06F 3/048* (2006.01)

(52) U.S. Cl.
USPC .......................................... 715/752; 455/466

(58) Field of Classification Search
USPC ........... 715/752, 784, 711, 715, 234; 455/466
See application file for complete search history.

(56) References Cited

U.S. PATENT DOCUMENTS

| | | | |
|---|---|---|---|
| 6,169,911 B1 | 1/2001 | Wagner et al. | |
| 2002/0171682 A1* | 11/2002 | Frank et al. | 345/790 |
| 2005/0278585 A1* | 12/2005 | Spencer | 714/46 |
| 2006/0059432 A1* | 3/2006 | Bells | 715/768 |
| 2008/0070605 A1* | 3/2008 | Kim | 455/466 |
| 2008/0096593 A1* | 4/2008 | Park | 455/466 |
| 2008/0163090 A1* | 7/2008 | Cortright | 715/771 |
| 2008/0209311 A1* | 8/2008 | Agronik et al. | 715/234 |

FOREIGN PATENT DOCUMENTS

| | | |
|---|---|---|
| EP | 0605945 | 7/1994 |
| EP | 1624378 | 2/2006 |
| WO | 02/087270 A1 | 10/2002 |
| WO | 2009013720 | 1/2009 |

OTHER PUBLICATIONS

Wikipedia, "Posting Style", http://en.wikipedia.org/wiki/Posting_style.
Word Using the Split Screen Trick in Word 2002, Word for Dummies online article, Wiley, http://www.dummies.com/WileyCDA/DummiesArticle/Word-Using-the-Split-Screen-Trick-in-Word-2002.id-327.html.

* cited by examiner

*Primary Examiner* — Matt Kim
*Assistant Examiner* — Tuan S Nguyen
(74) *Attorney, Agent, or Firm* — Ridout & Maybee LLP (57) ABSTRACT

A method and device to simplify message reply composition on a communications device, using a partially transparent overlay to allow a user to freely scroll and move around to other sections of a message or message chain while still being able to see and edit the reply being composed. When the reply is scrolled such that the composition field is not visible on the display screen, the device displays the overlay when the user enters text or on user request. The user may then type text into the overlay while viewing the underlying portion of the reply message, such as previous messages in the string.

21 Claims, 9 Drawing Sheets

METHOD AND DEVICE TO SIMPLIFY MESSAGE COMPOSITION

FIELD OF THE APPLICATION

The present application relates generally to the field of mobile devices, and in particular to mobile devices with user input means allowing a user to compose messages and replies to messages on the device itself.

BACKGROUND

Mobile devices present unique usability challenges because of their small screens. The typical mobile device must be small and light enough to be carried by the typical user comfortably, and this often results in mobile device screens with a fraction of the size and/or resolution of typical desktop screens. In order to maintain usability, a message that does not fill an entire desktop screen may need to be displayed in multiple pages when viewed on a mobile screen.

When composing a lengthy message, a user sometimes needs to scroll up and down in order to refer to various sections of the message. When the user wishes to write again, the user must then scroll back to where he wishes to write before typing. This tedious scrolling reduces productivity and concentration and instead forces the user to focus on the user interface instead of on the message being composed.

A similar issue exists when a user composes a reply to a message chain. A message chain is a series of messages where one reply is placed on top of another reply, as in the case of a typical top-posting message chain. In this case, even the composition of a short reply may require the user to scroll down in order to refer to other messages in the message chain. When the user wishes to write his reply, the user must then scroll back up to the top before typing his reply. Similarly, if the email chain contains multiple statements to which the user wishes to respond to in his reply, the user may need to scroll down and up multiple times when composing his reply. Again, this tedious scrolling reduces productivity and concentration and forces the user to concentrate his attention on the user interface instead of the reply being composed.

This issue is further compounded when the user is composing the reply on a mobile device, as the small screen size and/or lower screen resolution requires the user to do much more scrolling than on a comparable desktop screen.

Accordingly, it would be advantageous to have a method and device that, in part, improves message composition.

DESCRIPTION OF THE FIGURES

Similar reference numerals may have been used in different figures to denote similar components.

DESCRIPTION OF SPECIFIC EMBODIMENTS

Embodiments of the present application are not limited to any particular posting convention, communications architecture, operating system, or system architecture. It can be appreciated by those skilled in the art that the messages and messaging systems referenced herein applies equally to all messaging systems, including but not limited to Short Message Service (SMS) systems, email systems, Instant Messaging (IM) systems, and any other messaging system where information is sent from a source to a receiver over a communications network.

The present application discloses a method and device to simplify message composition on a communications device, and in particular allows a user to freely scroll and move around to other sections of a message or message chain while still being able to see and edit the message being composed. In one embodiment, the present application relates to methods and devices applicable to composing messages which contain an input or editable area and a textual area to which the user may wish to refer. For example, the methods and device may be applied to composing reply messages.

In one aspect, the method starts when a user composes a reply to a message on a communications device. When this happens, a scrollable message composition window is displayed showing the reply. The reply includes a primary area and a secondary area, and the secondary area includes a copy of the message. If a first event is detected when the message composition window has been scrolled such that the primary area of the reply is not visible, an overlay is displayed. The overlay includes an input area for the input of elements. When a second event is detected, the overlay is removed and the elements entered into the input area of the overlay are inserted into the primary area of the reply.

In an example embodiment, a device embodying the above method is configured for communications with a network and includes a display, a communication subsystem for sending and receiving messages over the network, a memory, an user input device, and a processor for controlling the operation of the display. The processor is configured to display a scrollable message composition window showing a reply to a message. The reply includes a primary area and a secondary area, and the secondary area includes a copy of the message. If the processor detects a first event when the message composition window has been scrolled such that the primary area of the reply is not visible, it is configured to display an overlay in response to the first event, the overlay including an input area for the input of elements. On the detection of a second event, the processor is configured to remove the overlay and insert the elements entered in the input area of the overlay into the primary area of the reply.

In another example embodiment, a computer program product includes a computer readable medium having encoded on it computer executable instructions for composing a reply to a message, the computer executable instructions including instructions for displaying a scrollable message composition window showing the reply, where the reply includes a primary area and a secondary area, and where the secondary area includes a copy of the message. If a first event is detected when the message composition window has been scrolled such that the primary area of the reply is not visible, the medium includes instructions to display an overlay in response to the first event, the overlay including an input area for the input of elements. If a second event is detected, the medium includes instructions to remove the overlay and insert the elements entered in the input area of the overlay into the primary area of the reply.

In one aspect, the method automatically presents the user with a partially transparent overlay on top of a window showing, among other things, the message being replied to. This allows the user to compose his reply into an input area on the overlay while simultaneously retaining the ability to scroll and view any portion of the message being replied to. The user may dismiss the overlay at any time and insert the text entered in the input area of the overlay into his reply.

One aspect of the method presents a user with a scrollable message composition window showing, among other elements, an area for the user to compose a reply (the reply composition area) and a copy of the message being replied to (the message). The user is free to scroll up and down the message composition window at his leisure. It is possible for the user to scroll the message composition window so that the reply composition area scrolls off and is no longer visible on the screen. If the user starts composing his reply while the reply composition area is no longer visible, such as by the typing of an alphabetic or numeric character while the reply composition area is no longer visible, an overlay with an input area is displayed and the user's reply is shown in the input area of the overlay. This overlay remains visible even while the user scrolls to various other sections of the message. Thus, the user is able to scroll to various other sections of the message and see and edit his reply at the same time, even though the reply composition area is not visible. The user may dismiss the overlay at any time and insert the text entered in the input area of the overlay into the reply composition area.

In another aspect, the present application discloses a method of composing a message on a communications device. The method includes displaying a message composition window showing the message, the window containing an editable composition field; receiving a first input instruction to display an overlay; displaying an overlay in response to the first input instruction, the overlay including an input area for the input of elements; receiving a second input instruction; and in response to the second input instruction, removing the overlay and inserting the elements entered in the input area of the overlay into the editable composition area of the message composition window.

In some embodiments, the first input instruction is a manual user input to cause display of the overlay. The overlay may be layered atop the message composition window if it is visible on the screen when the manual user input is received. If the user has switched to view another application, such as a calendar, document, contact list, etc., then the overlay may be displayed atop the currently visible window or application view.

In the case of a message composition wherein there is a defined composition area, such as a reply composition field, and a second area containing text (whether editable or not) to which the user may wish to refer, then the method may automatically determine whether to display an overlay without explicit user instructions based on whether the user inputs text or other elements for inclusion in a message composition while the defined composition area is not visible on the screen. In some example embodiments, the method may include determining whether a cursor or caret is positioned within the defined composition area or within the second area and displaying the overlay if the cursor or caret is outside the defined composition area. It will be appreciated that in the latter embodiments the defined composition area may be wholly or partly visible on the screen while the cursor or caret is outside the composition area.

It will be appreciated that in most embodiments the overlay is sized smaller than the screen size so as to enable the user to view the underlying window, whether it is a reply message, new message, or different application. It will also be appreciated that in some embodiments, the overlay may be at least partly transparent to permit the user to view the underlying window while composing his or her message.

Figures 5A, 5D:
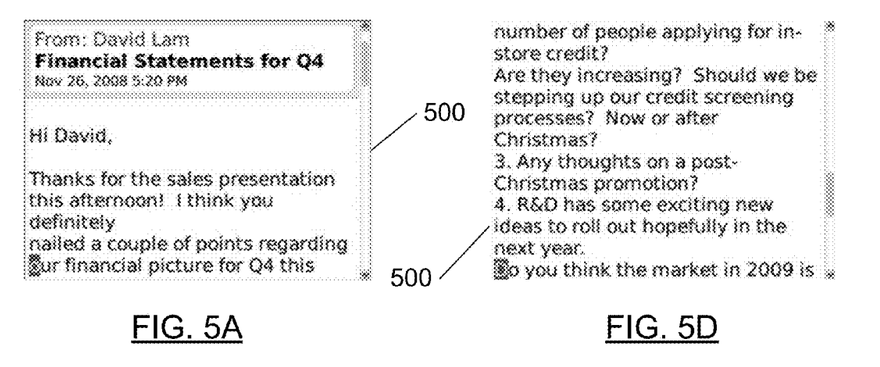
FIG. 5A shows an exemplary scrollable message spanning more than one page.
FIGS. 5B, 5C, 5D, 5E, and 5F show subsequent pages of the exemplary scrollable message of FIG. 5A.
Figures 5B, 5E:
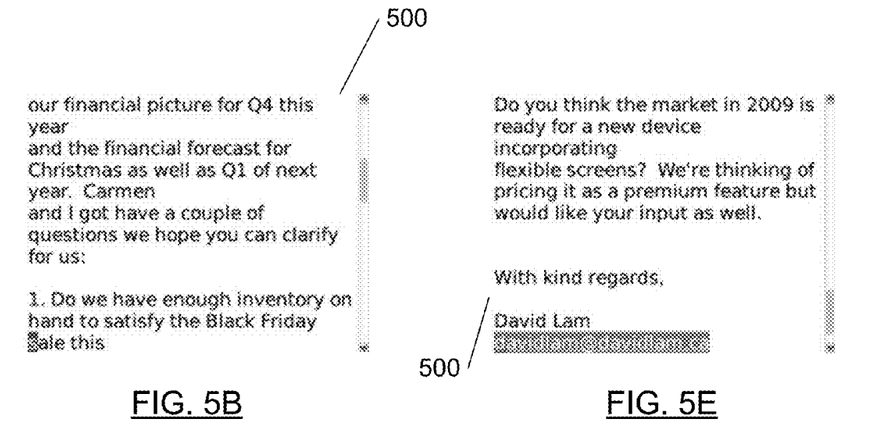
Figures 5C, 5F:
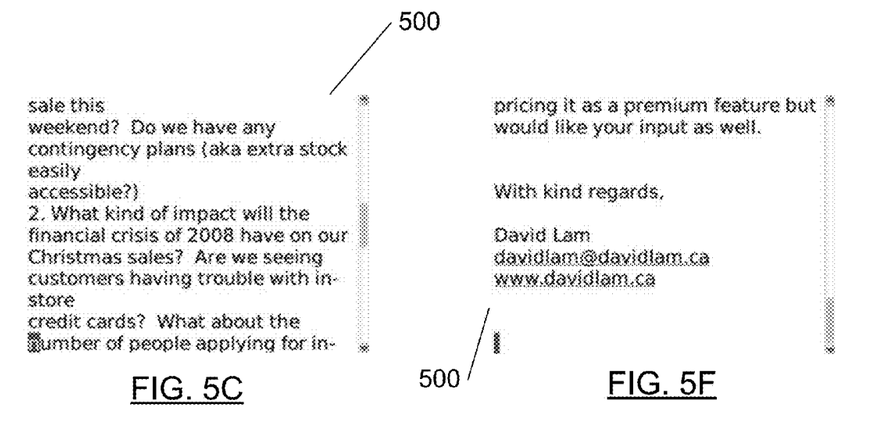

Referring now to the drawings, FIG. 5A to 5F shows an exemplary scrollable message 500 spanning more than one page, with FIGS. 5B to 5F showing subsequent pages of the exemplary scrollable message 500 of FIG. 5A. As this example shows, message 500 spans more than one page and seeks responses to a number of questions or issues.

One embodiment of the method will now be described using exemplary scrollable message 500.

Figure 6A:
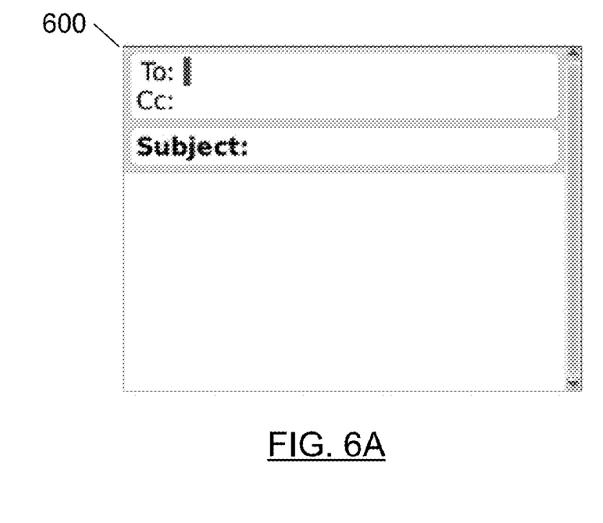
FIG. 6A shows an exemplary scrollable message composition window.
Figure 6B:
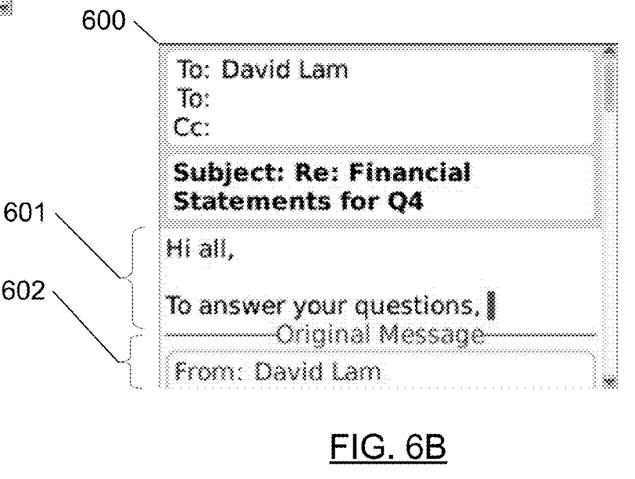
FIG. 6B shows another exemplary scrollable message composition window.

FIG. 6A shows an exemplary blank message composition window 600. FIG. 6B shows another exemplary message composition window 600 allowing a user to reply to message 500. As shown in FIG. 6B, message composition window 600 includes a reply composition area 601 and an area 602 showing a copy of the message being replied to.

Figure 7A:
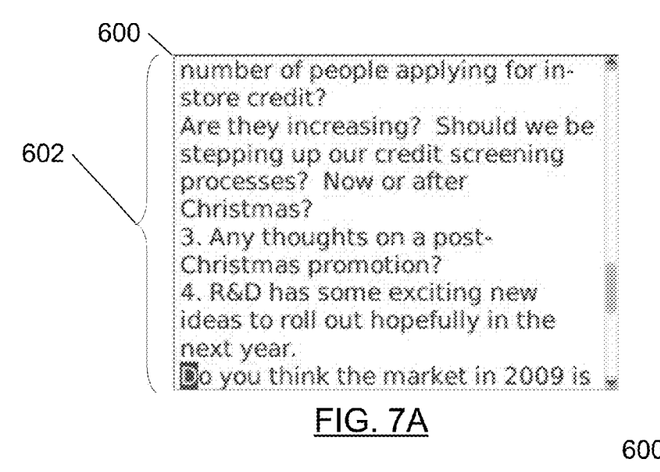
FIG. 7A shows another view of the exemplary scrollable message composition window of FIG. 6B.

When composing a reply to exemplary scrollable message 500, a user may need to scroll to various sections of message 500 in order to refer to the various questions or issues being discussed. As seen in FIG. 7A, a user who scrolls through message 500 in order to view various sections of message 500 (in this case scrolling to view questions 3 and 4) will also scroll reply composition area 601 off the screen.

Figure 7B:
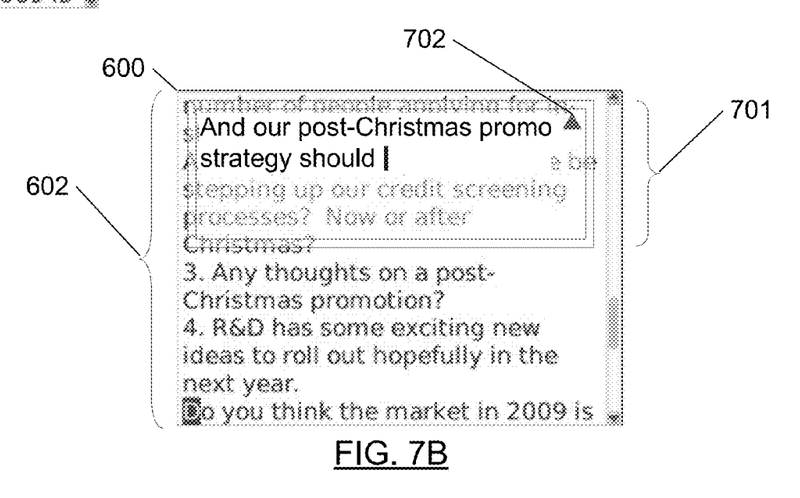
FIG. 7B shows an exemplary view of an overlay on the exemplary scrollable message composition window of FIG. 7A.

If the user starts composing his reply while reply composition area 601 is no longer visible, such as by the typing of an alphabetic or numeric character while reply composition area 601 is no longer visible, an overlay with an input area is displayed and the user's reply is shown in the input area of the overlay. FIG. 7B shows an overlay 701 superimposed onto area 602 of message composition window 600. The user's reply is shown in the input area of the overlay. Overlay 701 remains visible even while the user scrolls to various other sections of message 500. Thus, the user is able to scroll and refer to various other sections of message 500 and at the same time see and edit his reply, even though reply composition area 601 is not visible. The user may dismiss overlay 701 at any time and insert the text entered in the input area of the overlay into reply composition area 601.

Figure 7C:
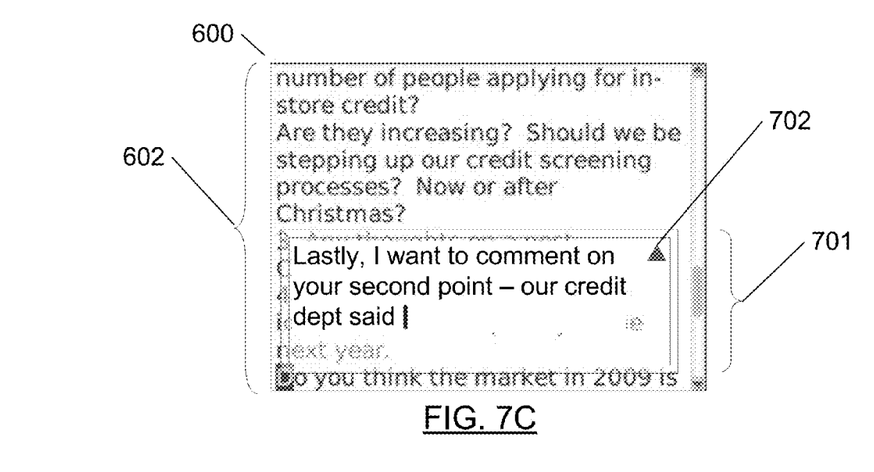
FIG. 7C shows another exemplary view of an overlay on the exemplary scrollable message composition window of FIG. 7A.

The overlay may be of any size, shape or colour, and may or may not include a border. Overlay 701 in FIG. 7B shows an exemplary overlay with a thin white border and black text occupying the top half of the display. Overlay 701 in FIG. 7C shows an exemplary overlay occupying the bottom half of the display. The overlay may be moved automatically by the system. For example, if a user is scrolling down, the overlay may be moved to the top half of the display so that text or graphics scrolling onto the screen from the bottom can be easily seen. Similarly, if a user is scrolling up, the overlay may be moved to the bottom half of the display so that text or graphics scrolling onto the screen from the top can be easily seen. Furthermore, the overlay may be resized automatically by the system. For example, if the input area of the overlay contains a single line of text, then the system may resize the overlay vertically so the input area of the overlay is only one line high. Similarly, if the user types a second line of text or pastes an object or character bigger than the current size of the overlay (such as a rich text object, a picture, an emoticon, or any other object), the system may resize the overlay accordingly. Those skilled in the art can appreciate that a placeholder or a thumbnail may be used in circumstances where resizing the overlay will be detrimental to device usability. This automatic moving and resizing of the overlay maximizes the portion of area 602 under Overlay 701 that the user is able to see and reference, thus improving the usability of the communications device. Those skilled in the art can also appreciate that the overlay may also be moved or resized at any time by the user through any user-generated event.

The overlay may be transparent, partially transparent, opaque, or any combination or degree thereof. As well, different areas of the overlay may have different degrees of transparency. Overlay 701 in FIG. 7B shows an exemplary overlay with different areas having different degrees of transparency—0% transparency in the area of the overlay where text exists and 50% transparency in all other areas of the overlay. This 0% transparency may be determined on a character-by-character basis or by a line-by-line basis (as in Overlay 701). Either way, a partially transparent overlay allows the user to see and refer to portions of area 602 even if it is under Overlay 701. As well, ensuring that 0% transparency applies only to a portion of the input area of the overlay rather the entire input area of the overlay maximizes the portion of area 602 under Overlay 701 that the user is able to see and reference, thus improving the usability of the communications device. Those skilled in the art can appreciate that overlay transparency or opacity settings may also be expressly determined by the user in user preference settings.

In some embodiments, the user is able to see and edit text already in the reply composition area from within the overlay. This improves usability of the communications device as it provides the user a sense of continuity between the text in the reply composition area and the text in the overlay, and allows easier completion of thoughts when transitioning to the overlay. Overlay 701 in FIG. 7B shows an exemplary overlay 701 with exemplary upward indicator 702. Upward indicator 702 indicates the presence of additional text above the currently displayed two lines. If the user scrolls up more than the currently displayed two lines, additional text from the reply composition area may be viewed and edited from within the overlay. As those skilled in the art appreciate, where additional text from the reply composition area exists below the currently displayed lines, a corresponding downward indicator may be displayed. In another aspect, a freshly invoked overlay may also be pre-populated with a few words already in reply composition area 601 in order to provide additional continuity to the user.

Figure 3:
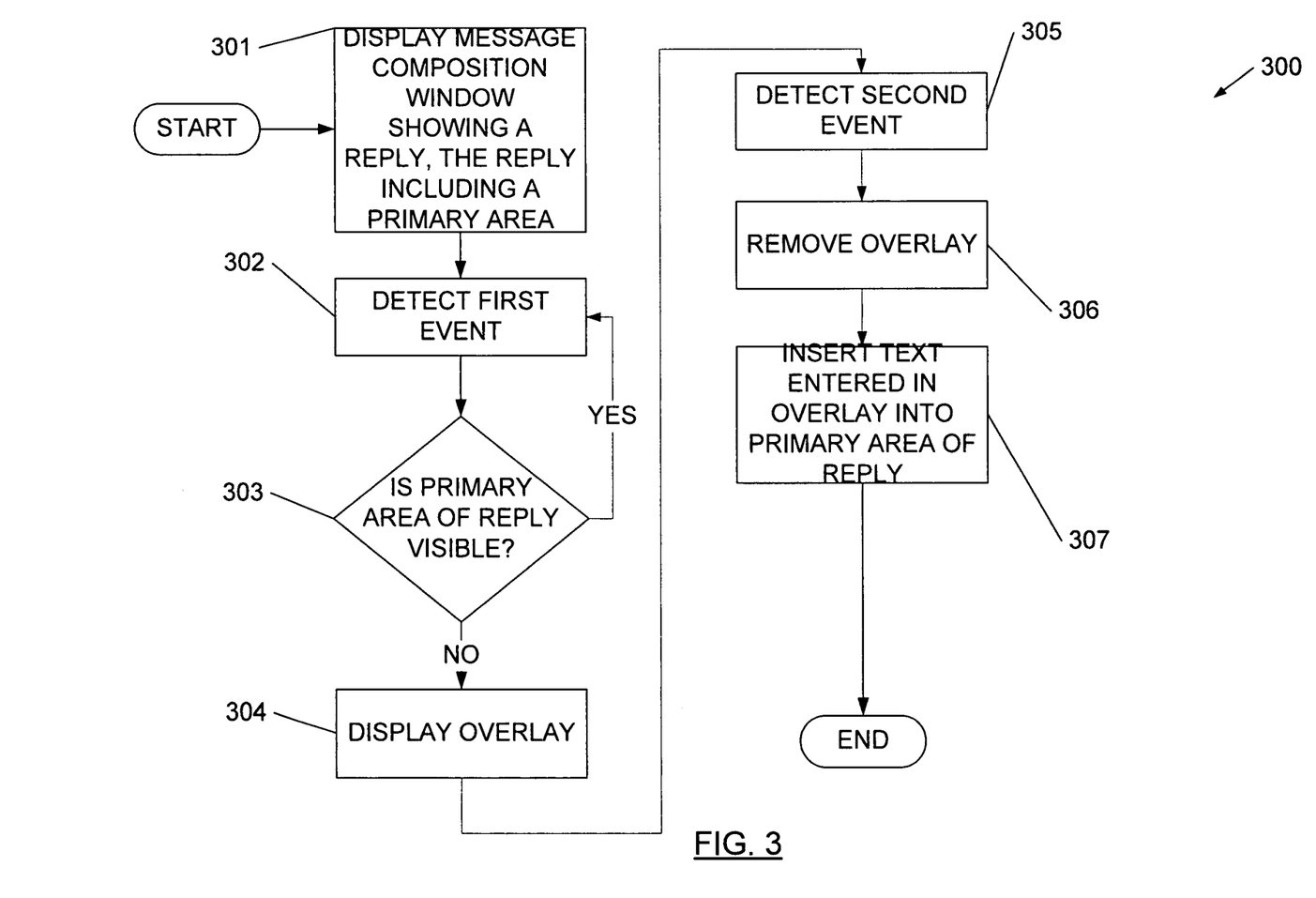
FIG. 3 shows a flowchart of a method described in the present application.

Reference is now made to FIG. 3, which shows a flowchart of an example method 300 for simplifying reply message composition. To start, a message composition window is displayed, showing a reply and a primary area, as in step 301. As exemplary message composition window 600 follows top-posting convention, the primary area is the reply composition area 601. The method 300 then loops until it detects an event while the primary area of the reply is not visible, as in steps 302 and 303. For exemplary message composition window 600, the method 300 loops until a user starts composing his reply while reply composition area 601 is no longer visible, such as by the typing of an alphabetic or numeric character while reply composition area 601 has been scrolled off the screen and is no longer visible. Once this condition is satisfied, an overlay is displayed, as in step 304. The overlay is displayed until a second event is detected, as in step 305. This second event may be any user-generated event, such as a button press, a menu selection, a gesture, or an accelerometer event; it may be any system event, such as an automatic timeout or an incoming call; or it may be any combination of an user-generated event and system event, such as a button press while an automatic timeout has not elapsed. In any case, once this second event is detected, the overlay is removed (step 306) and the text entered in the overlay is inserted into the primary area of the reply (step 307). For exemplary message composition window 600, the text entered in the overlay is inserted into reply composition area 601.

Figure 4:
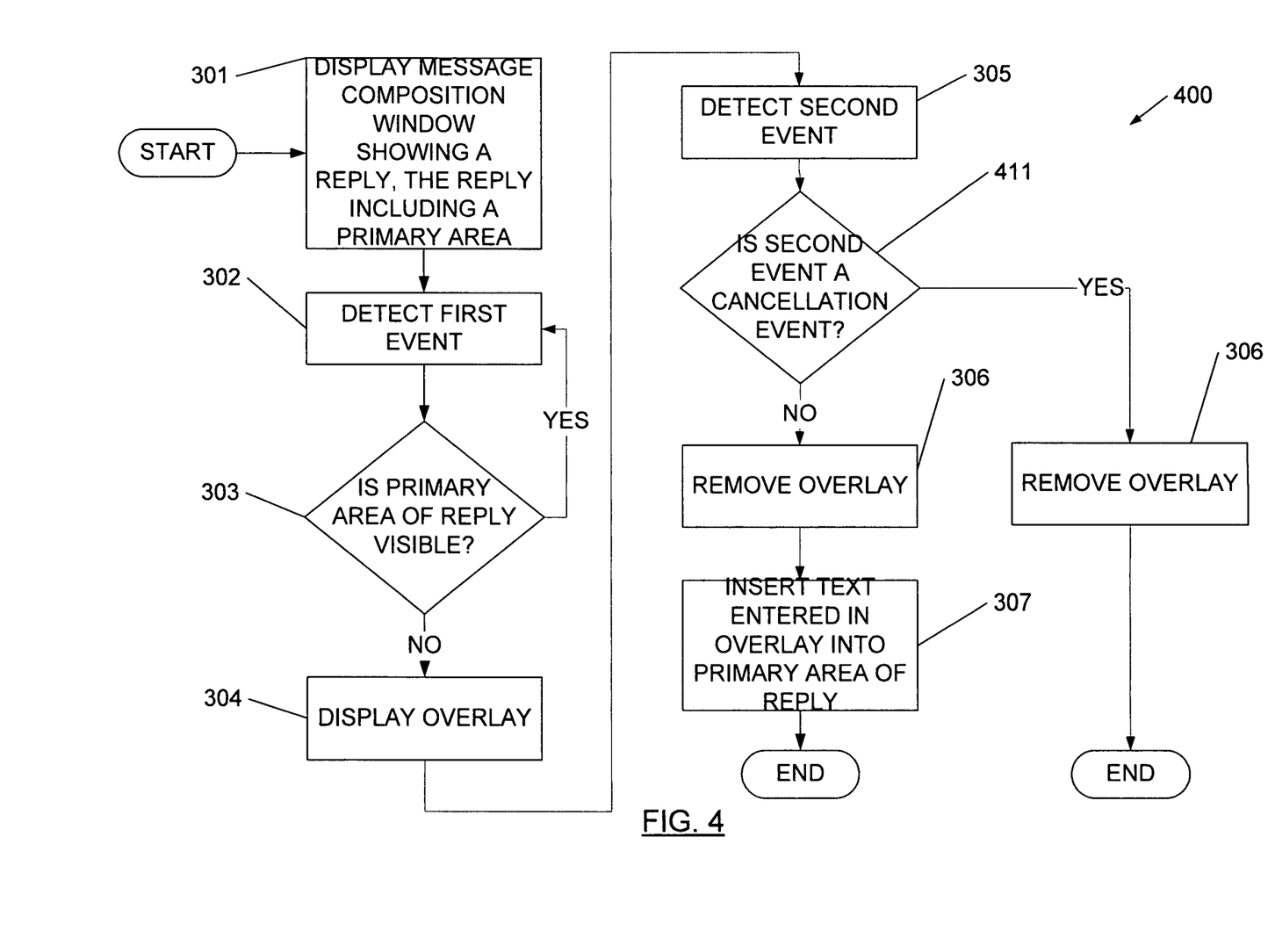
FIG. 4 shows a flowchart of another method described in the present application.

In another aspect, the second event may be a cancellation event where the user wishes to dismiss the overlay and discard any text entered into the overlay. Referring now to FIG. 4, another example method 400 is illustrated in flowchart form. In method 400, steps 305 and 411, once the second event is detected it is determined if it is a cancellation event. If so, the method 400 proceeds to dismiss the overlay, as in step 306, and completes. If the second event is not a cancellation event, the method 400 proceeds as before and dismisses the overlay (step 306) and the text entered in the overlay is inserted into the primary area of the reply (step 307).

In a further aspect, the second event may be any other special event represented by any user-generated event, any system event, or any combination thereof. In one example, the second event may be an event that allows the user to preview text entered in the overlay in the reply composition area before the text is actually inserted in the reply composition area. In another example, the second event may be an event that not only inserts the text entered in the overlay into the reply composition area but also sends the reply.

Message 500 may be a message chain comprising of one or more messages. In that case, it can be appreciated by those skilled in the art that such an embodiment would work in a similar fashion as those embodiments described above.

In another aspect, the methods described herein may be explicitly invoked by a user, whether or not the primary area of the reply message composition window is visible. For example, a user may invoke an overlay even when reply composition area 601 is visible, such as by pressing a special button, a special sequence of buttons, a special gesture, or by selecting an item from a menu. In this case, after such a first event is detected at step 302, step 303 is skipped and the overlay is displayed immediately at step 304.

Figure 8A:
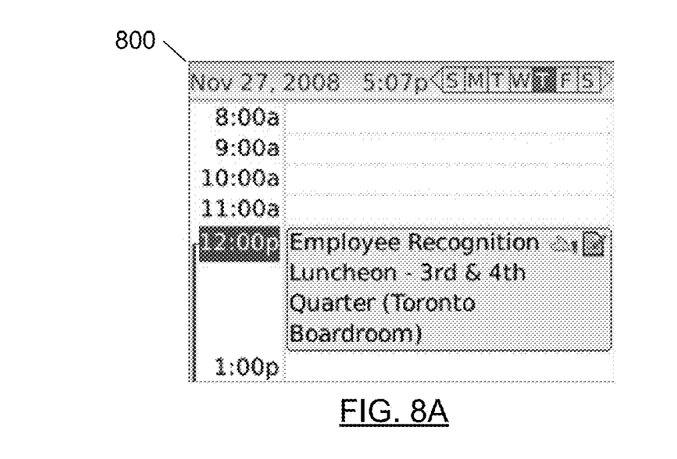
FIG. 8A shows an exemplary view of a calendar displayed on a device.
Figure 8B:
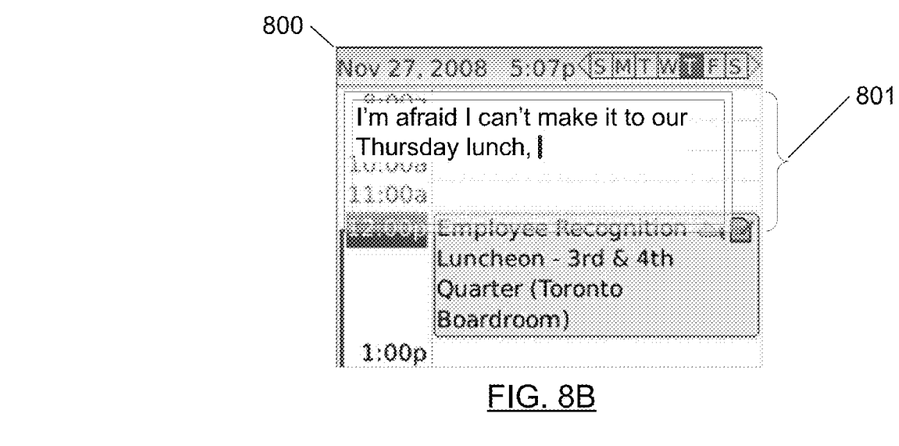
FIG. 8B shows an exemplary view of an overlay on the exemplary view of the calendar of FIG. 8A.
Figure 8C:
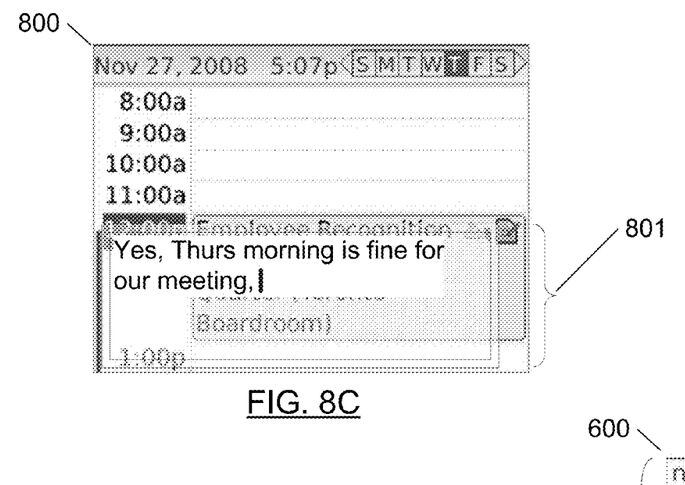
FIG. 8C shows another exemplary view of an overlay on the exemplary view of the calendar of FIG. 8A.

In yet a further aspect, the methods described herein apply equally well outside the confines of a messaging application. For example, a user may receive a message asking for a lunch meeting and wants to consult his calendar before composing a reply. This example scenario is illustrated in FIGS. 8A through 8C. FIG. 8A shows an example display of a calendar interface. FIG. 8B shows an example display of the calendar interface with an overlay superimposed. In this example, after receiving an invitation to a Thursday lunch meeting, the user invokes an overlay and proceeds to launch his calendar application 800. Upon reviewing the calendar entry for the relevant date, the user is able to immediately compose his reply while his calendar is present in the background, ready for instant referral by the user. The overlay may also include a shortcut back to the message composition window in the messaging application, or allow the user to send the message immediately without re-entering the messaging application at all. In yet another example, after reviewing his calendar the user may manually invoke an overlay and compose a message or a reply while keeping calendar application 800 in the background, as in FIG. 8C. Those skilled in the art can appreciate that the use of the calendar application is an example and the method described herein applies equally well in any other application or window.

Figure 1:
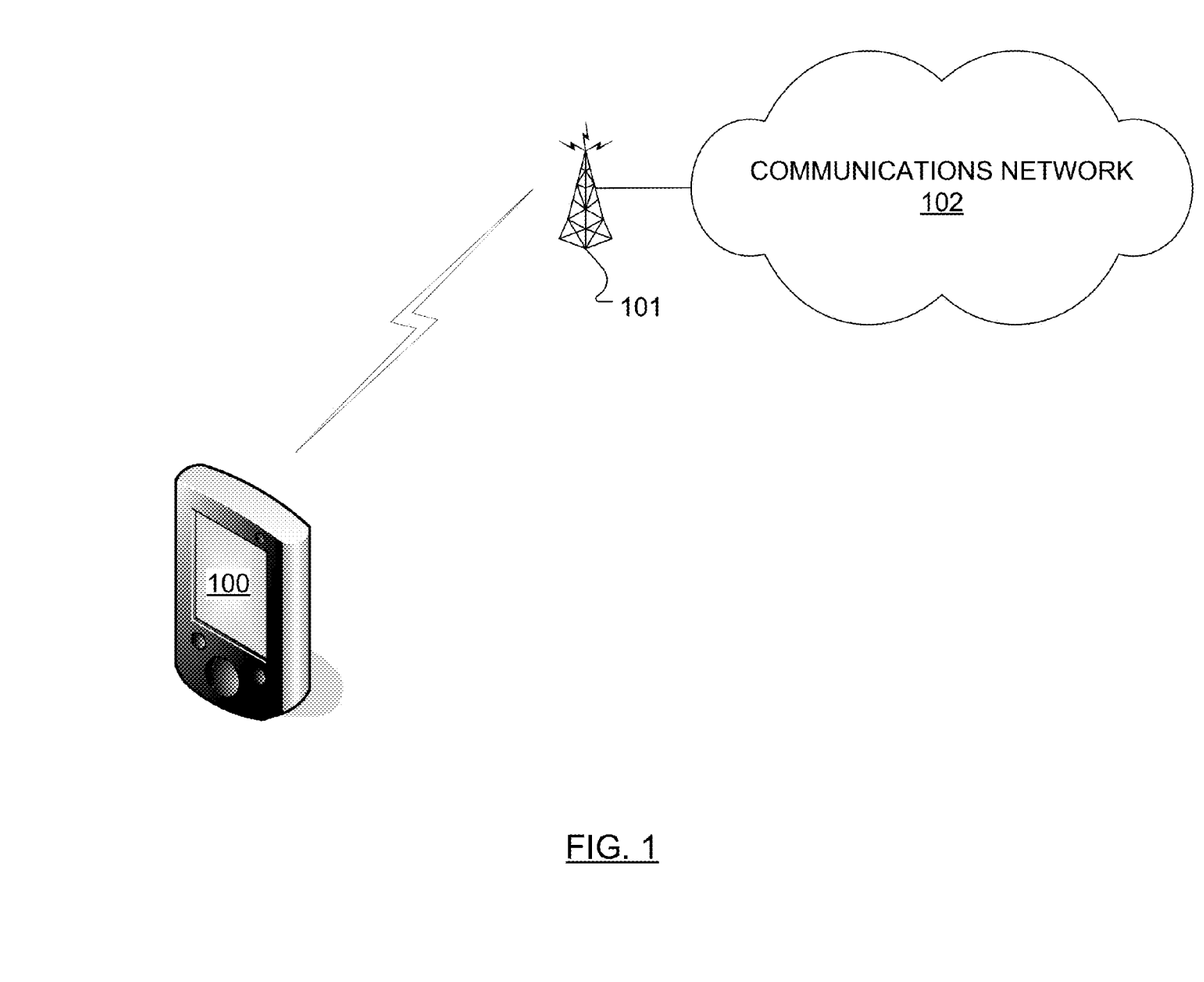
FIG. 1 shows a block diagram view of an exemplary communications device as part of a communications network.
Figure 2:
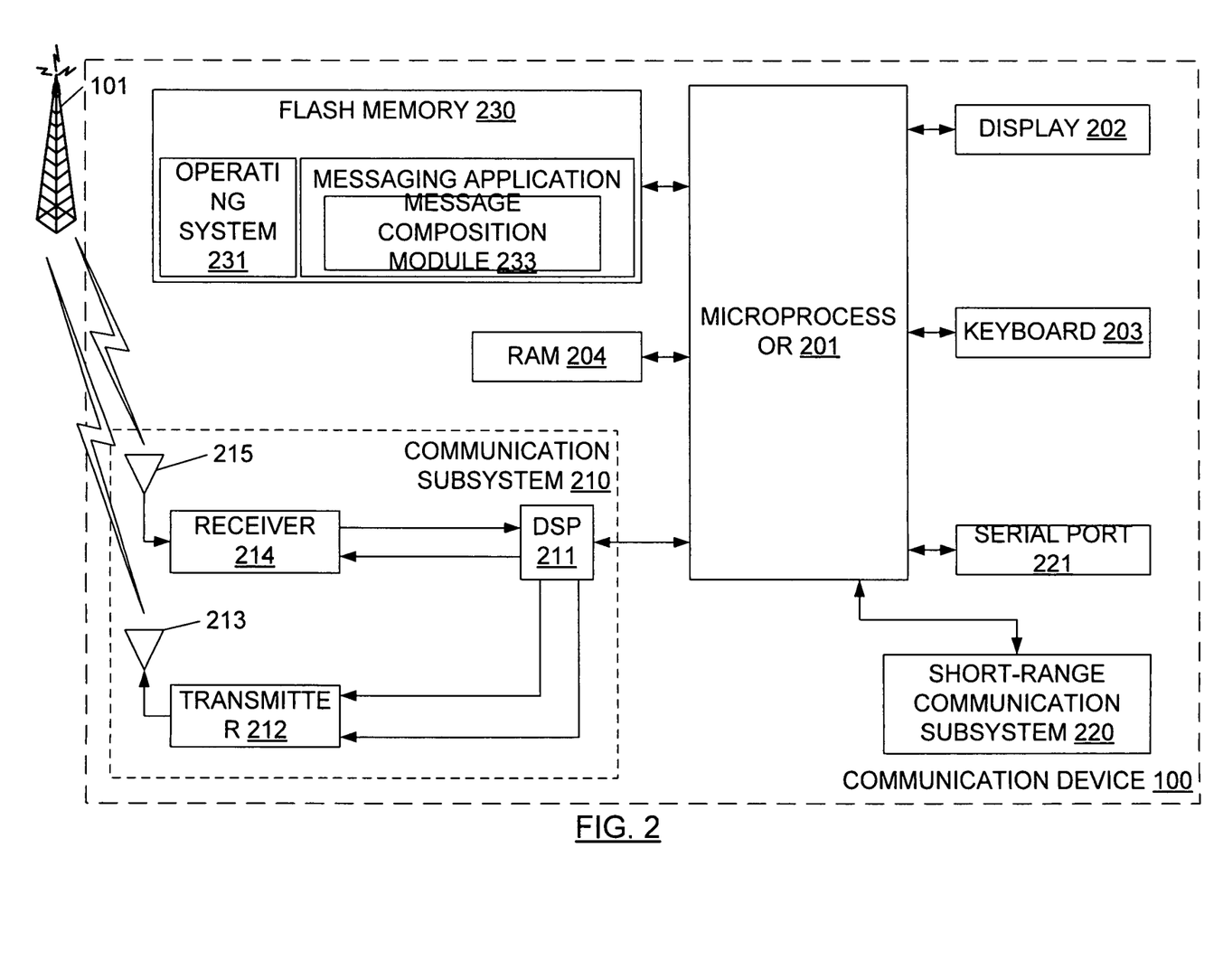
FIG. 2 shows a block diagram view of an exemplary communications device.

FIG. 1 shows a block diagram view of an exemplary communications device as part of a communications network embodying the method described herein. Communications device 100 is shown as a wireless device communicating with wireless tower 101, which in turn is part of a greater communications network 102. FIG. 2 shows a block diagram view of exemplary communications device 100, which includes a microprocessor 201 interfacing with flash memory 230, RAM 204, display 202, keyboard 203, serial port 221, short-range communication subsystem 220 and communication subsystem 210. Communications subsystem 210 in turn includes digital signal processing unit 211 interfacing with a receiver 214 and a transmitter 212, along with their respective antennas 215 and 213.

Flash memory 230, which contains operating system 231, messaging application 232 and message composition module 233, also includes instructions to control display 202, accept input from keyboard 203 and serial port 221, and accept input and output from short-range communication subsystem 220 and communication subsystem 210.

Those skilled in the art can appreciate that messaging application 232 and message composition module 233 may be implemented as a separate application running under operating system 231 or may be implemented as an integral part of operating system 231. Messaging application 232 and message composition module 233 may also reside on a server outside device 100, with device 100 acting as a dumb terminal.

Referring still to FIG. 2, operating system software and various software applications such as messaging applications or calendar applications used by the microprocessor 201 are, in one example embodiment, stored in a persistent store such as flash memory 230 or any similar non-volatile storage store. Applications may also be stored on a server in a client-server model with communication device 100 acting as a dumb terminal. Those skilled in the art can appreciate that the operating system or the various software applications, or parts thereof, may be temporarily loaded into volatile storage such as RAM 204. Received communications signals may also be stored to volatile or non-volatile storage.

In an example embodiment, microprocessor 201 executes operating system functions and/or software applications. During data communications, a received signal such as a message will be processed by the short-range communications subsystem 220 or communications subsystem 210 and input to the microprocessor 201, which further processes the received signal for output to the display 202. A user of communications device 100 may compose messages and replies to messages within messaging application 232 using keyboard 203 or from any other input device attached to serial port 221 or short-range communication subsystem 220. Such messages and/or replies may be transmitted and received over a communications network through the short-range communications subsystem 220 or communications subsystem 210. Messages, variables, and user preferences may be stored in any volatile or non-volatile storage store such as flash memory 230 or RAM 204. Those skilled in the art can appreciate that any data or information stored in volatile storage meant to be retained must be committed to non-volatile storage before any power-down or reset event.

Short-range communications subsystem 220 provides for communications between device 100 and other similarly equipped devices, which need not necessarily be similar devices. In an example embodiment, short-range communications subsystem 220 may include an infrared device or a Bluetooth communications module. Similarly, serial port 221 provides for communications between device 100 and other similarly equipped devices but not necessarily similar devices. Example embodiments of serial port 221 may include USB ports, parallel ports, or a RS-232 ports.

Communications network 102, in an example embodiment, is connected to a wireless network, of which wireless tower 101 is a part. Wireless tower 101 provides wireless radio coverage to device 100. Wireless tower 101 may be a voice and data network such as GSM, UMTS, HSPDA, CDMA, IEEE 802.11, WiMax or any other wireless technology.

While FIGS. 1 and 2 depict an exemplary communications device operating in a wireless communications network, those skilled in the art can appreciate that the method and device claimed herein applies equally to all communications devices, irrespective of the underlying communications network technology or the size or mobility of the device. Therefore, it is contemplated that device 100 need not be a wireless communications device. Messages and/or replies may be transmitted and/or received over a wired communications network connected to device 100 by, for example, serial port 221. Device 100 may also lack communication subsystems 210 and 220 entirely and rely on periodic docking or synchronization with an external communications device or an external server to send or receive messages. In such an example embodiment, in docked mode the device 100 will receive messages through its docking connection and store these received messages in an "Inbox" in non-volatile memory. In undocked mode the device 100 will store messages to be sent in an "Outbox" in non-volatile memory, and only when docked will the device 100 send the messages in its-"Outbox" through its docking connection.

It can be appreciated by those skilled in the art that while the method, exemplary device and examples are described herein using top-posting convention (replies are appended to the message being replied to), the methods and devices described herein may be applied to any posting convention, whether the convention is top-posting, bottom-posting, inline-posting, or any combination or variant of the above. For example, exemplary message composition window 600 follows top-posting convention, so the primary area is the reply composition area 601 and the secondary area is reply message area 602, and reply composition area 601 is placed above reply message area 602. However, if bottom-posting convention is followed, then the primary area is the reply composition area 601 and the secondary area is reply message area 602, but reply composition area 601 is placed below reply message area 602. As a further example, if in-line posting convention is followed, then the primary area is the reply composition area 601 and the secondary area is reply message area 602, but reply composition area 601 is interlaced in reply message area 602. Furthermore, it can further be appreciated by those skilled in the art that a user may expressly specify his desired posting convention through user preference settings.

It can also be appreciated by those skilled in the art that the text input area of the overlay is not limited to plain text, but includes elements such as rich text, HTML formatted text, graphics, sounds, movies, slideshows, placeholders, thumbnails, files, attachments, links, and any other textual and non-textual elements as well.

Certain adaptations and modifications of the described embodiments can be made. Therefore, the above discussed embodiments are considered to be illustrative and not restrictive.

While variants have been described in detail in the foregoing specification, it will be understood by those skilled in the art that variations may be made without departing from the scope of the application, being limited only by the appended claims.

What is claimed is:

1. A method of composing a reply to a message on a communications device, comprising:
    displaying a scrollable message composition window showing the reply, wherein the reply includes a primary area and a secondary area, and wherein the secondary area includes a copy of the message;
    detecting a first event when the message composition window has been scrolled such that the primary area of the reply is not visible;
    displaying an overlay in response to the first event, the overlay including an input area for the input of elements;
    detecting a second event; and
    in response to the second event, removing the overlay and inserting the elements entered in the input area of the overlay into the primary area of the reply.

2. The method of claim 1 wherein the elements entered in the input area of the overlay is inserted at a user-selectable location.

3. The method of claim 1 wherein at least two portions of the overlay have different degrees of transparency.

4. The method of claim 1 further including showing a preview of the message composition window with the elements inserted before said elements are inserted into the message composition window.

5. The method of claim 1 wherein the overlay displays elements from the primary area, the secondary area or both areas of the message composition window.

6. The method of claim 5 wherein the displayed elements from the primary area, the secondary area or both areas of the message composition window are editable from the input area of the overlay.

7. The method of claim 1 wherein the element comprises alphabetic and numeric characters.

8. A device configured for communications with a network, the device comprising;
    a display;
    a communication subsystem for sending and receiving messages over the network;
    a memory;
    an user input device; and
    a processor for controlling the operation of the display, wherein the processor is configured to display a scrollable message composition window showing a reply to a message, wherein the reply includes a primary area and a secondary area, and wherein the secondary area includes a copy of the message;
    detect a first event when the message composition window has been scrolled such that the primary area of the reply is not visible;
    display an overlay in response to the first event, the overlay including an input area for the input of elements;
    detect a second event; and
    in response to the second event, remove the overlay and insert the elements entered in the input area of the overlay into the primary area of the reply.

9. The device of claim 8 wherein the processor is configured to insert the elements entered in the input area of the overlay at a user-selectable location.

10. The device of claim 8 wherein the processor is configured to display different degrees of transparency for at least two portions of the overlay.

11. The device of claim 8 wherein the processor is configured to display a preview of the message composition window with the elements inserted before said elements are inserted into the message composition window.

12. The device of claim 8 wherein the processor is configured to display elements from the primary area, the secondary area or both areas of the message composition window in the input area of the overlay.

13. The device of claim 12 wherein the processor is configured to allow the editing of the displayed elements from the primary area, the secondary area or both areas of the message composition window from the input area of the overlay.

14. The device of claim 8 wherein the element comprises alphabetic and numeric characters.

15. A computer program product comprising a non-transitory computer readable medium having encoded thereon computer executable instructions for composing a reply to a message, said computer executable instructions comprising:
    instructions to display a scrollable message composition window showing the reply, wherein the reply includes a primary area and a secondary area, and wherein the secondary area includes a copy of the message;
    instructions to detect a first event when the message composition window has been scrolled such that the primary area of the reply is not visible;
    instructions to display an overlay in response to the first event, the overlay including an input area for the input of elements;
    instructions to detect a second event; and
    instructions to remove the overlay and insert the elements entered in the input area of the overlay into the primary area of the reply in response to the second event.

16. The computer program product of claim 15 wherein the elements entered in the input area of the overlay at a user-selectable location.

17. The computer program product of claim 15 wherein at least two portions of the overlay have different degrees of transparency.

18. The computer program product of claim 15 further including instructions for showing a preview of the message composition window with the elements inserted before said elements are inserted into the message composition window.

19. The computer program product of claim 15 wherein the overlay displays elements from the primary area, the secondary area or both areas of the message composition window.

20. The computer program product of claim 19 wherein the displayed elements from the primary area the secondary area or both areas of the message composition window are editable from the input area of the overlay.

21. The computer program product of claim 15 wherein the element comprises alphabetic and numeric characters.

* * * * *